(12) United States Patent
Keita et al.

(10) Patent No.: US 7,007,556 B2
(45) Date of Patent: Mar. 7, 2006

(54) METHOD FOR DETERMINING A MASS FLOW OF A FLUID FLOWING IN A PIPE

(75) Inventors: Mamadi Keita, Basel (CH); Rainer Höcker, Waldshut-Tiengen (DE); Oliver Popp, Fislisbach (CH)

(73) Assignee: Endress + Hauser Flowtec AG, Reinach (CH)

( * ) Notice: Subject to any disclaimer, the term of this patent is extended or adjusted under 35 U.S.C. 154(b) by 193 days.

(21) Appl. No.: 10/648,807

(22) Filed: Aug. 27, 2003

(65) Prior Publication Data

US 2004/0244499 A1 Dec. 9, 2004

(30) Foreign Application Priority Data

Aug. 28, 2002 (DE) .......................... 102 40 189

(51) Int. Cl.
*G01F 1/32* (2006.01)

(52) U.S. Cl. .................................... 73/861.22
(58) Field of Classification Search ............. 73/861.24, 73/861.22, 861.47
See application file for complete search history.

(56) References Cited

U.S. PATENT DOCUMENTS 4,448,081 A    5/1984   Kolitsch et al.
4,716,770 A    1/1988   Herzog
4,807,481 A *  2/1989   Lew ........................ 73/861.24
5,060,522 A   10/1991   Lew
5,152,181 A   10/1992   Lew
5,214,965 A *  6/1993   Lew ........................ 73/861.24

FOREIGN PATENT DOCUMENTS

| DE | 32 39 126 A1 | 5/1983 |
| DE | 35 44 198 A1 | 6/1987 |
| DE | 38 16 623 C1 | 11/1989 |
| DE | 196 19 632 A1 | 11/1997 |
| WO | WO 93/07450 | 4/1993 |

* cited by examiner

*Primary Examiner*—Edward Lefkowitz
*Assistant Examiner*—Jewel V. Thompson
(74) *Attorney, Agent, or Firm*—Bacon & Thomas

(57) ABSTRACT

A method wherein vortices are produced in a flowing fluid by means of a bluff body and the repetition frequency with which the vortices are produced is determined. The repetition frequency is used to determine a flow rate measurement value, which represents a volume flow or a flow velocity. Additionally, pressures $p_1$ and $p_2$ acting in the flowing fluid at two measurement points separated from one another in the flow direction are registered. At least one of these pressures changes at least as a function of the repetition frequency. The registered pressures $p_1$, $p_2$ are used to produce a pressure measurement value, which represents an average dynamic pressure acting in time average at least partly in the flow direction. The pressure measurement value and the flow rate measurement value are used to determine a mass flow rate value for the fluid.

14 Claims, 14 Drawing Sheets

METHOD FOR DETERMINING A MASS FLOW OF A FLUID FLOWING IN A PIPE

FIELD OF THE INVENTION

The invention relates to a method for determining a mass flow, i.e. mass flow rate, of a fluid flowing in a pipe using a vortex flow measurement device.

BACKGROUND OF THE INVENTION

Vortex flow measurement devices are often used for measuring flow of fluids flowing in pipes, and especially is this the case for high temperature and/or high pressure gas- or vapor-flows. Typical variants in construction and use of such vortex flow measurement devices are described, for example, in the following U.S. Pat. Nos. 4,448,081, 4,523,477, 4,716,770, 4,807,481, 4,876,897, 4,973,062, 5,060,522, 5,121,658, 5,152,181, 5,321,990, 5,429,001, 5,569,859, 5,804,740, 6,003,384, 6,170,338, 6,351,999, and 6,352,000.

The manner in which usual vortex flow measurement devices function is based on using periodic pressure fluctuations in a Karman vortex street. These arise, as is known, when a fluid is allowed to flow against an obstacle to the flow, for instance against a bluff body. Vortices are periodically released from this bluff body to its downstream side and these form the mentioned vortex street. The repetition frequency, with which the vortices are formed, is proportional over an extended Reynolds number range to the flow velocity of the fluid, which means that volume flow, i.e. volume flow rate, can be measured practically directly by means of such vortex flow measurement devices.

A vortex flow measurement device of the described kind usually includes a measurement tube of preselected length, in whose lumen the mentioned bluff body is arranged, preferably along a diameter of the measurement tube. The inlet and outlet ends of the measurement tube are connected to the pipe containing the fluid to be measured, so that, during operation of the vortex flow measurement device, the fluid can be allowed to flow through the measurement tube and, consequently, be made to flow against the bluff body.

Characteristic for such vortex-producing bluff bodies is that they exhibit on their upstream side an essentially flat, flow impingement surface, which laterally abruptly ends, in order to form at least two, as sharp as possible, separation edges. Beginning at the separation edges, the bluff bodies then narrow on the downstream side. This can occur e.g. continuously, or, as shown e.g. in U.S. Pat. No. 5,569,859, even stepwise. Besides the two separation edges, the bluff body can also exhibit other separation edges.

Finally, at least one sensor element is situated in the bluff body or is arranged downstream from the bluff body internally at the wall of the measurement tube or externally at the wall or within the wall. The pressure fluctuations associated with the vortices are registered and changed into electrically processable signals by means of the e.g. capacitively, inductively or piezoelectrically operating sensor element arranged in the bluff body itself or downstream therefrom. It can also be an ultrasonic sensor. The electrically processable signals have a frequency which is directly proportional to the volume flow rate in the measurement tube.

The electrical signals produced by the sensor element are processed by a corresponding evaluation electronics of the vortex flow measurement device and can e.g. be displayed on location and/or be further processed in higher level evaluation units.

As already indicated, a flow velocity of the fluid to be measured, and/or the volume flow rate derived therefrom, can be practically directly measured by means of such vortex flow measurement devices. Starting with the measured volume flow rate and an instantaneous fluid density registered simultaneously therewith, or even subsequently, an instantaneous mass flow rate can be indirectly determined, as e.g. also described in WO-A 95/11,425, and the following U.S. Pat. Nos. 4,876,897, 4,941,361, 5,121,658, and 5,429,001. As shown in the U.S. Pat. Nos. 4,448,081, 4,523,477, 4,807,481, 4,973,062, 5,060,522, 5,152,181, 5,429,001, 5,804,740, and 6,170,338, it is furthermore also possible to determine the mass flow rate by means of such vortex flow measurement devices using the measured volume flow rate and a dynamic pressure acting in the fluid in the flow direction.

Especially in WO-A 95/11,425, and the U.S. Pat. Nos. 5,429,001, and 6,170,338, it is proposed to determine the dynamic pressure using an amplitude curve, particularly a time-averaged amplitude curve, of a vortex measurement signal changing periodically with the repetition frequency of the vortex, which signal corresponds to a plot of pressure versus time as registered locally in the vortex street. Investigations have, however, shown that the amplitude curve or also the average amplitude curve of such a vortex measurement signal is proportional to the dynamic pressure practically only in the case of a steady state flow. Beyond this, it is proposed e.g. in U.S. Pat. No. 4,448,081 to determine the dynamic pressure on the basis of amplitude versus time of elastic deformations of the bluff body impinged by the flow.

SUMMARY OF THE INVENTION

In contrast to this, the vortex flow measurement device described in U.S. Pat. No. 5,152,181 registers the dynamic pressure in a predominantly vortex-free region of the flowing fluid for the purpose of measuring mass flow rate. This is done using additional pressure sensors arranged in the lumen of the measurement tube upstream from the bluff body.

Given the mentioned state of the art, it is an object of the invention to improve the measurement of mass flow rate by means of vortex flow measurement devices to the effect that they will exhibit a high accuracy also in the case of non-steady-state, and, especially, disturbed, flow. Additionally, the improved measurement should be capable of being carried out even with conventional vortex flow detector types. Beyond this, it is an object of the invention to obtain other measurement parameters representing the fluid or the fluid flow, particularly a viscosity of the fluid, using the measurement signals, particularly the vortex measurement signals, produced in vortex flow measurement devices of the described type.

To attain the object, the invention comprises a method for determining the mass flow rate of a fluid flowing in a pipe, which method includes the following steps:

producing vortices, especially Karman vortices, in the flowing fluid by means of a bluff body, around which the fluid flows, the bluff body having at least two separation edges, and determining a repetition frequency with which the vortices are produced, producing, on the basis of the determined repetition frequency, a flow rate measurement value, which represents a volume flow rate or a flow velocity, local registering of a first pressure acting in the flowing fluid at a first measurement point, which is located, with reference to the flow direction, by the two separation edges of the bluff body or downstream from at least one of the separation edges, and local registering of a second pressure acting in the flowing fluid at a second measurement point separated from the first measurement point in the flow direction,
wherein, by action of the generated vortices, at least one of the registered pressures changes, at least at times, periodically with the repetition frequency, producing, through the use of the registered first and second pressures, a pressure measurement value that represents an average dynamic pressure acting, averaged over time, in the flow direction, as well as producing, on the basis of the pressure measurement value and the flow rate measurement value, a mass flow rate measurement value representing the mass flow rate.

According to a first, further development of the method of the invention, the repetition frequency, with which the vortices are produced, is determined on the basis of at least one of the registered pressures.

According to a second, further development of the method of the invention, at least one of the measurement points is arranged at the bluff body or inside thereof.

According to a third, further development of the method of the invention, a pressure difference between the two locally registered pressures is determined for producing the pressure measurement value.

According to a fourth, further development of the method of the invention, a differential pressure sensor, especially one arranged within the bluff body, is exposed, especially simultaneously, to the first and second pressures for registering the pressure difference.

According to a fifth, further development of the method of the invention, a pressure difference signal is derived from the locally registered pressures to represent the pressure difference.

According to a sixth, further development of the method of the invention, the pressure difference signal is low-pass filtered for producing the pressure measurement value.

According to a seventh, further development of the method of the invention, the pressure difference signal is digitized for producing the pressure measurement value.

According to an eighth, further development of the method of the invention, the pressure measurement value and/or flow measurement value is/are determined on the basis of a spectral analysis of the pressure difference signal.

According to a ninth, further development of the method of the invention, the first locally registered pressure is a total pressure acting in the flow direction.

According to a tenth, further development of the method of the invention, the second locally registered pressure is a static pressure acting in the fluid.

According to an eleventh, further development of the method of the invention, a sensor element in the form of an oscillating body arranged within, or downstream from, the bluff body is used for registering the pressure difference.

A basic concept of the invention is, on the one hand, to determine the dynamic pressure needed for the mass flow measurement on the basis of a pressure curve registered point-wise within the measurement tube lumen, which curve extends at least partially over a region affected by the vortices produced at the bluff body, and, on the other hand, to free the so-determined pressures not only from all possibly superimposed perturbations but also to average them over time and so to determine a constant part of the variable pressure curve.

The invention resides especially also in the recognition that, on the one hand, a time average of the essentially periodically varying pressure curve carries the information needed for the mass flow measurement and that, on the other hand, the mentioned pressure curve can advantageously already be estimated with sufficient accuracy on the basis of two pressures registered in the fluid downstream from the separation edges of the bluff body at points of measurement separated from one another in the direction of flow but otherwise selectable practically arbitrarily.

This has, among others, also the advantage that all measurement points for the pressures to be registered as required for the method of the invention can be arranged directly at the bluff body. Consequently, even pressure-sensitive sensor elements e.g. inside the bluff body can serve for registering the pressures. Additionally, the vortex repetition frequency also required for the volume flow rate measurement can be detected by means of conventional sensor elements arranged, for example, inside, or outside, of the bluff body. Because of this, compared to conventional vortex flow measurement detectors, only slight structural changes are needed, in order to realize the method of the invention.

BRIEF DESCRIPTION OF THE DRAWINGS

The invention will now be explained in greater detail on the basis of examples of embodiments illustrated in the figures of the drawing. In the figures, equal parts are provided with the same reference characters. The figures show as follows:

FIGS. 1 and 2 schematically illustrate the construction of a vortex detector 1 suited for the method of the invention.

DESCRIPTION OF THE PREFERRED EMBODIMENTS

Figure 1:
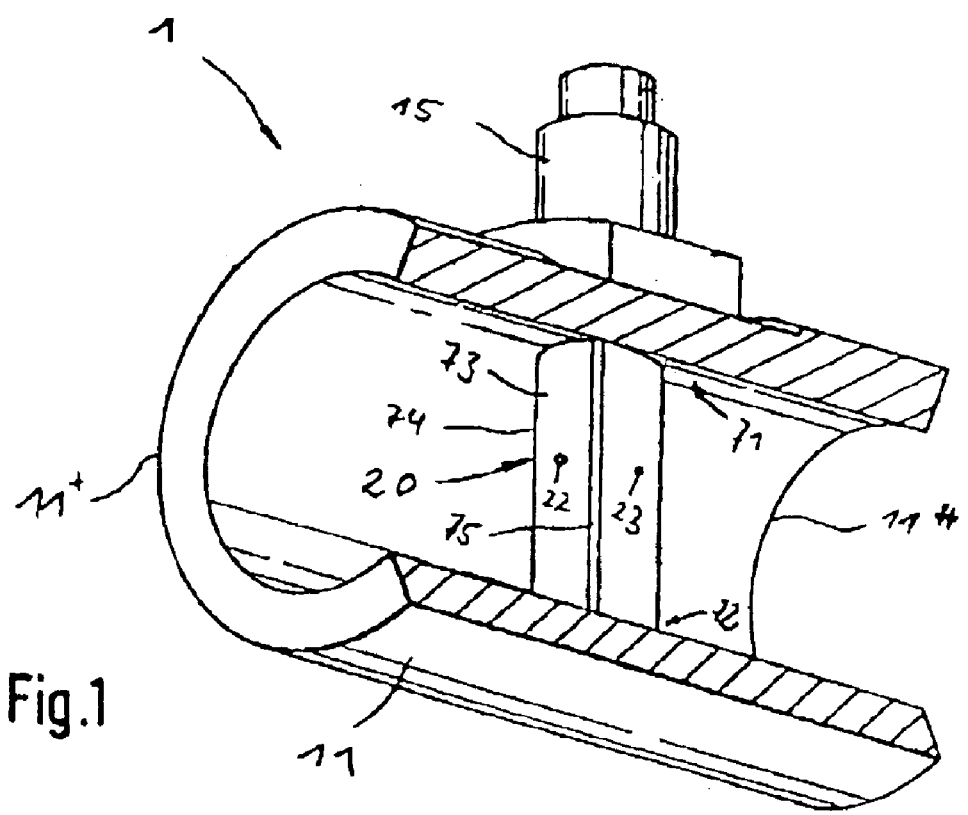
FIG. 1 an embodiment of a vortex detector in partially cross sectional, perspective view, FIG. 2 a cross section of a vortex flow measurement device having a vortex detector in accordance with FIG. 1, FIGS. 3a, b a sensor arrangement for a vortex detector in accordance with FIG. 1 schematically in two different cross sections, FIGS. 4a; 5a; 6a in each case, an embodiment of a bluff body for a vortex detector in accordance with FIG. 1, FIGS. 4b, c; 5b, c; 6b, c plots of pressure versus time obtained during operation using the vortex flow measurement device of FIG. 2, FIGS. 4d; 5d; 6d Plots of measurement signals versus time derived during operation of the vortex flow measurement device of FIG. 2 from the pressure versus time curves of FIGS. 4b, c, FIGS. 5b, c or FIGS. 6b, c, FIGS. 7a, b two different views of an embodiment for a further development of a vortex detector in accordance with FIG. 1, FIGS. 8a, b two different views of a further embodiment of an extension of a vortex detector in accordance with FIG. 1, FIG. 9 an embodiment of an electronic measurement converting circuit for a vortex flow measurement device in accordance with FIG. 2, FIG. 10 a further embodiment of an electronic measurement converter circuit for a vortex flow measurement device in accordance with FIG. 2, and FIGS. 11a, b Plots of pressure versus time obtained during operation by means of a vortex flow measurement device of FIG. 2.

The vortex detector 1 includes a measurement tube 11, which, when associated with a fluid-conducting pipe, in operation has a fluid to be measured, for example a liquid, a gas or a vapor, flowing through it. The measurement tube 11 is made usually of metal, such as e.g. high quality, even stainless, steel or cast iron; the material of the measurement tube 11 can, however, also be e.g. a suitable hard plastic.

The measurement tube 11 has a longitudinal axis, an inner surface, an inlet end 11⁺ and an outlet end 11⁺. This fixes the flow direction of the fluid; in the illustration of FIG. 2, both the longitudinal axis and the flow direction extend perpendicular to the plane of the drawing through the flow channel 12 formed by the measurement tube 11.

The measurement tube 11 has, additionally, an inner dimension and a wall thickness suitable therefor. The size of these two dimensions are functions of the nominal crosswise dimension and the allowable pressure of the fluid in the finished vortex detector.

Figure 2:
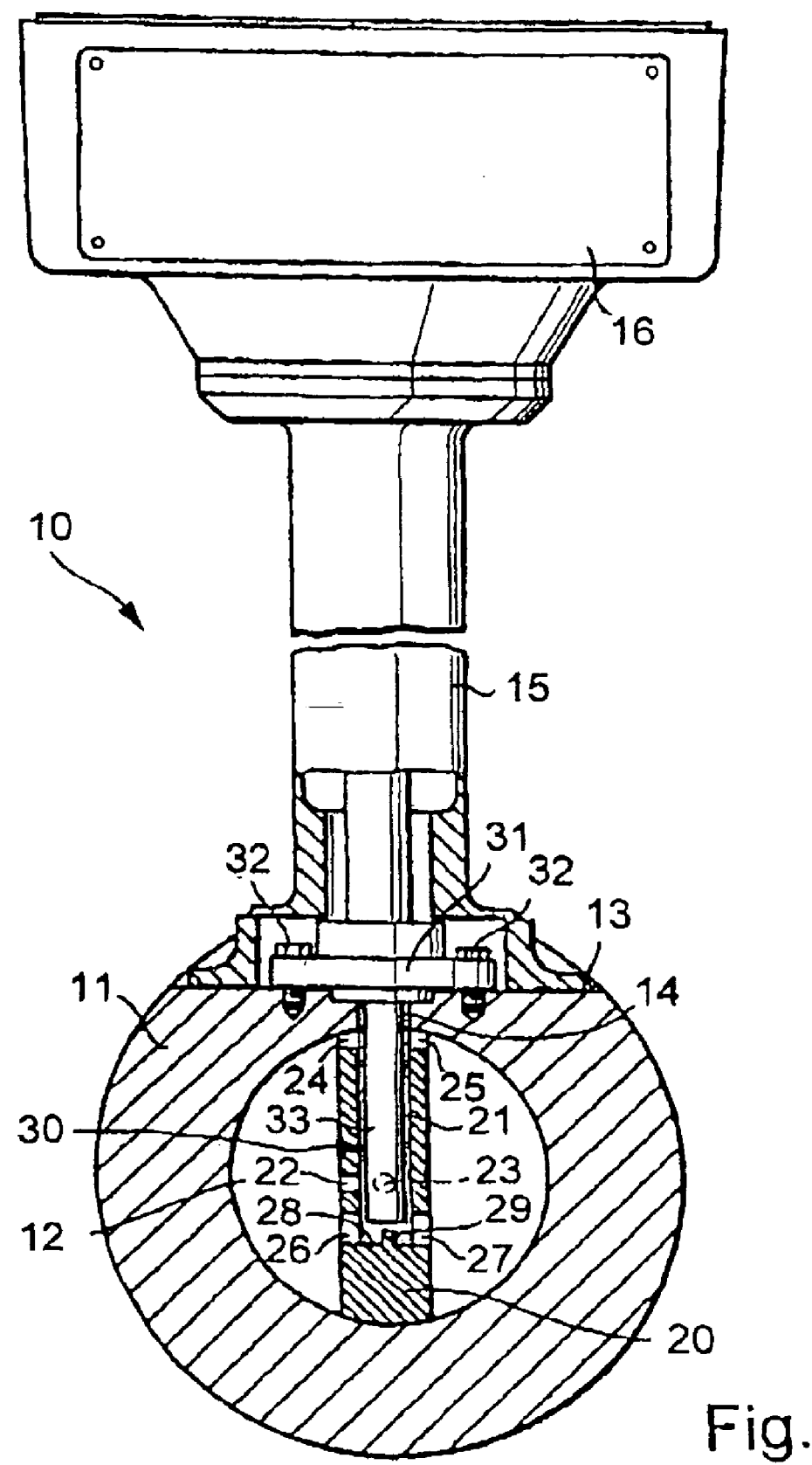

When the measurement tube 11 has a circular cross section, as is illustrated in FIGS. 1 and 2, the inner dimension is the diameter of the lumen of the measurement tube 11. The inlet end 11⁺ forms with the lumen a line of intersection; this is usually a circle, since the inlet end 11⁺ is flat and lies in a plane perpendicular to the longitudinal axis.

On the side of the measurement tube 11 lying on top in FIGS. 1 and 2, a flat area 13 is formed, from which a radial bore 14 extends into the interior of the measurement tube. Secured on the flat area 13 is a tubular housing nozzle 15, which carries on its end opposite to the measurement tube 11 an electronics compartment 16, which contains an electronic measurement converter circuit of the vortex flow meter.

In the interior of the measurement tube 11 is arranged a bluff body 20, which extends diametrically on a diameter of the flow channel 12, across the flow channel 12, and, as indicated in FIGS. 1 and 2, in doing this, is mechanically securely connected with the inner surface of the wall of the measurement tube 11 at each end in a first fixing zone 71 and a second fixing zone 72. This mechanically secure connection is usually produced in the common metal measurement tubes by welding.

The bluff body 20 is formed such that it produces vortices in the flow medium.

For this purpose, the bluff body 20 is formed, as is usual for this type of vortex detector, as a right prism with a prism axis and a cross sectional area, which exhibits a geometric form chosen by the manufacturer and which is perpendicular to the prism axis. In FIGS. 1 and 2, this geometric form is essentially an isosceles triangle or trapezoid. Instead of a right prism, other examples which can be used for the bluff body are e.g. a right, complete or partial, cylinder or e.g. even struts with T-shaped cross sections.

The bluff body 20 is arranged within the measurement tube 11 in such a way that a base surface serving as impingement surface 73 is oriented essentially crosswise to the fluid flow, with the impingement surface 73 being laterally terminated by first and second separation edges 74, 75.

In operation, when the fluid to be measured is allowed to flow against the impingement surface 73 of the bluff body 20, vortices are repeatedly produced at the two separation edges 74, 75. The time-referenced frequency, or repetition frequency, of the vortices is correlated in known manner by way of the instantaneous Strouhal number with the instantaneous volume flow rate. The Strouhal number, in turn, is nearly constant over a large range of Reynolds numbers. Because vortices alternately separate at each separation edge and are entrained by the flowing fluid, this leads downstream from the bluff body 20 to the formation of one Karman vortex street or two parallel vortex streets, wherein the vortices of the one vortex street are displaced relative to the vortices of the other vortex street.

Because of the vortices produced at the bluff body 20, pressures can be registered locally in the fluid in the region of the bluff body 20, especially its near region, even sometimes upstream therefrom. These pressures change with the repetition frequency of the vortices.

For the local registering of the pressures acting in the flowing fluid, especially, however, for the local registering of first and second pressures varying with time in the region of the bluff body 20, the vortex detector 1 includes a pressure sensitive sensor arrangement 8. Preferably, the sensor arrangement 8 also simultaneously registers the pressure fluctuations produced locally in the fluid by the vortices and in appropriate manner converts them to at least one electrical measurement signal, which exhibits both a signal amplitude, which corresponds to a dynamic pressure acting in the flow direction, and a signal frequency, which corresponds to the repetition frequency of the vortices.

In the embodiment of FIG. 1, the sensor arrangement 8 is arranged at least partially right in the bluff body 20. For receiving parts of the sensor arrangement, an axial chamber 21 is formed in the bluff body 20. This chamber extends from the upper end of the bluff body 20 in FIG. 1 over the greater part of its length. Inside of the bluff body 20, chamber 21 is so situated that it extends essentially coaxially with the bore 14.

The chamber 21 is preferably cylindrical and has the same inner diameter as the bore 14. Additionally, chamber 21 is connected with the flow channel 12 of the measurement tube 11 by way of at least a pair of passageways 22, 23.

In the embodiment shown in FIGS. 1 and 2, the passageway 22 is directed through the bluff body 20 crosswise to the flow direction, so that a first measurement point $M_1$ is defined with its exit on the lumen side downstream from the separation edge 74. Correspondingly, a first pressure $p_1$ acts on the first measurement point $M_1$, which pressure is at least partially a function of a static pressure existing there.

Figure 4A:
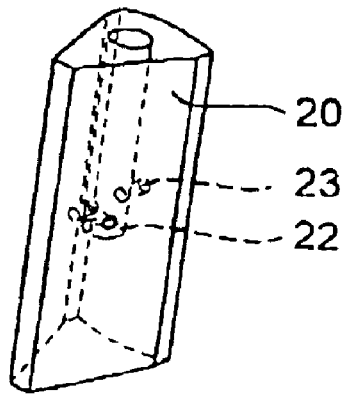
Figure 4A:
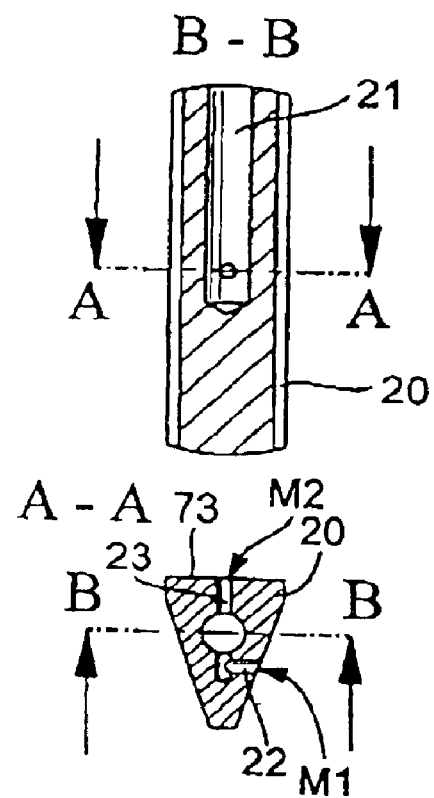
Figure 4C:
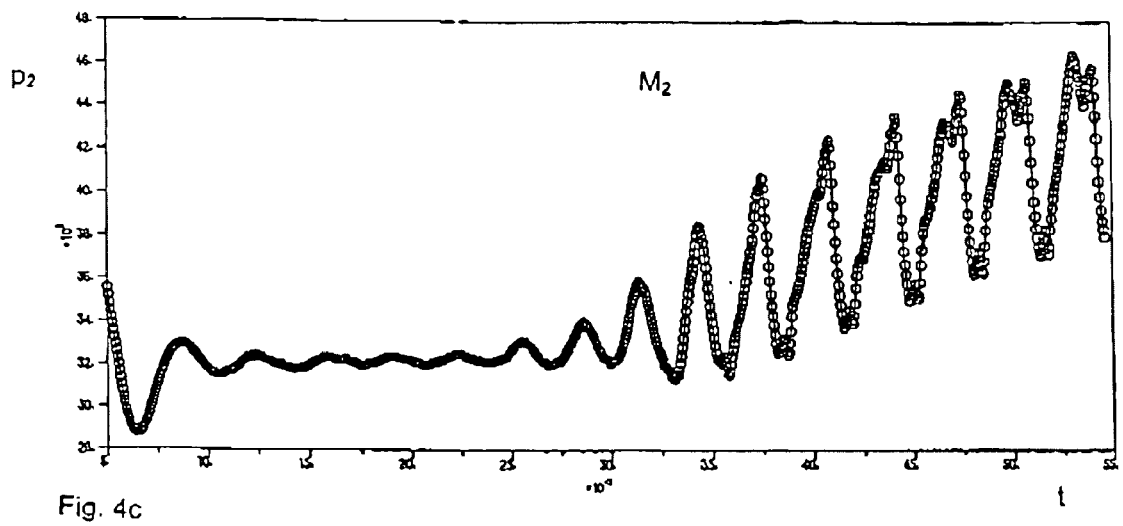
Figure 4B:
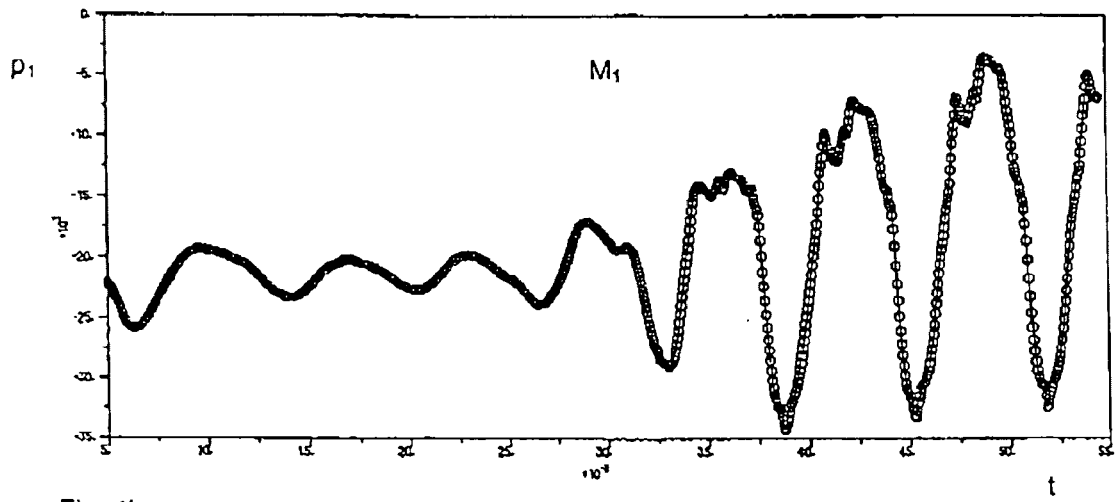
Figure 6A:
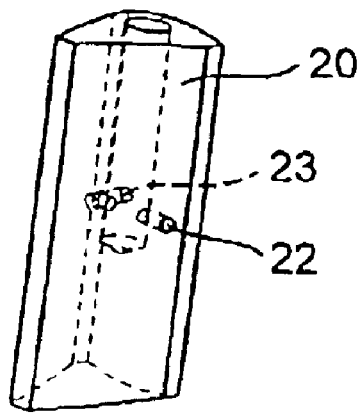
Figure 6A:
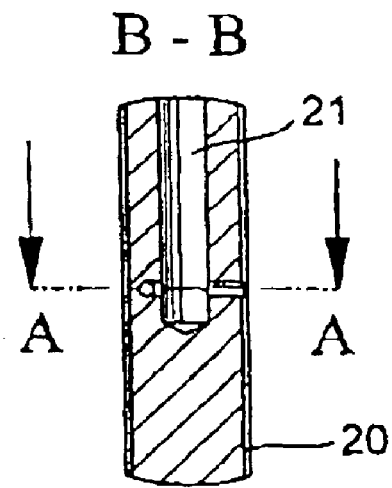
Figure 6A:
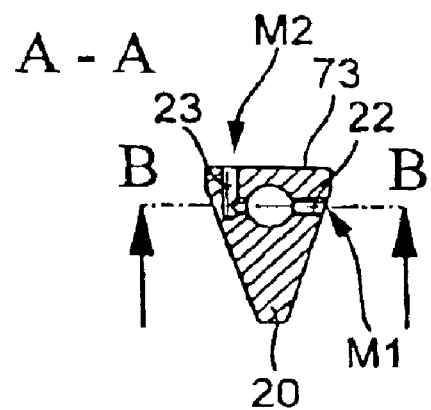
Figure 6B:
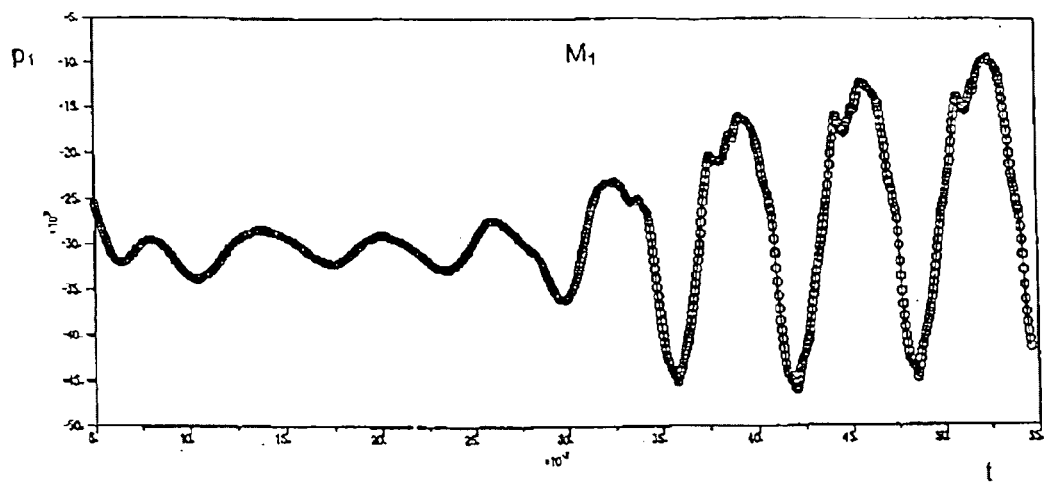
Figure 6C:
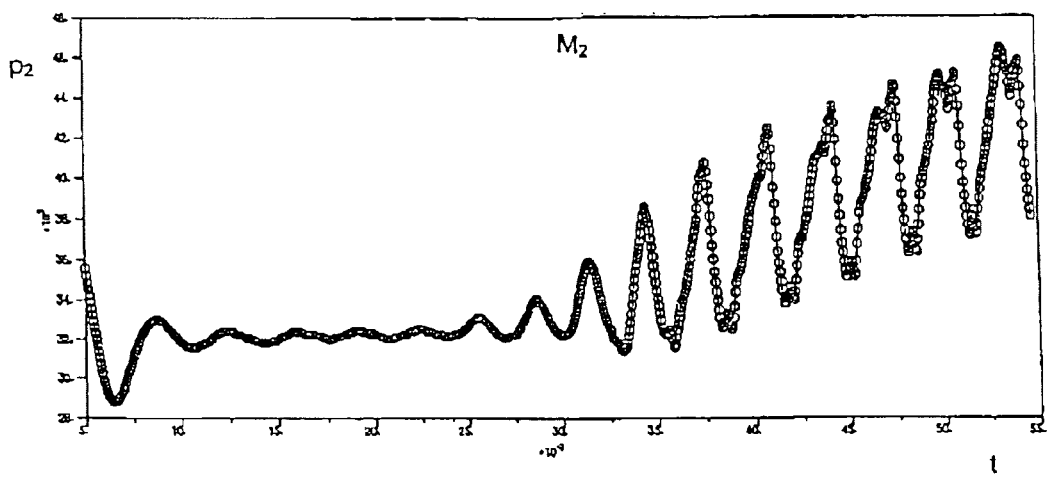

According to a further development of the invention, the passageway 23 extends, as illustrated schematically in FIG. 4a or 6a, in such a way in the bluff body 20 that a second measurement point $M_2$ defined with its exit on its lumen side is formed within the impingement surface 73. In this way, there acts on the second measurement point $M_2$ a second pressure $p_2$, which is a function of both a static pressure existing there and a dynamic pressure acting in the flow direction, thus corresponding for practical purposes to a whole, or total, pressure at measurement point $M_2$.

Figure 5A:
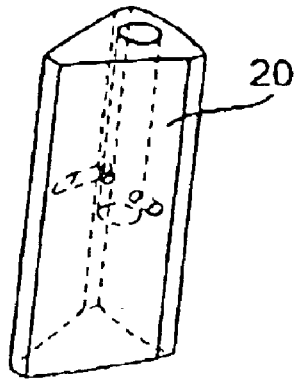
Figure 5A:
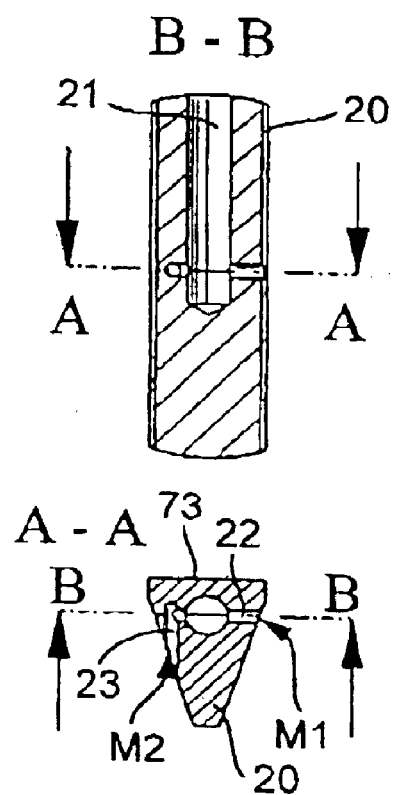
Figure 5B:
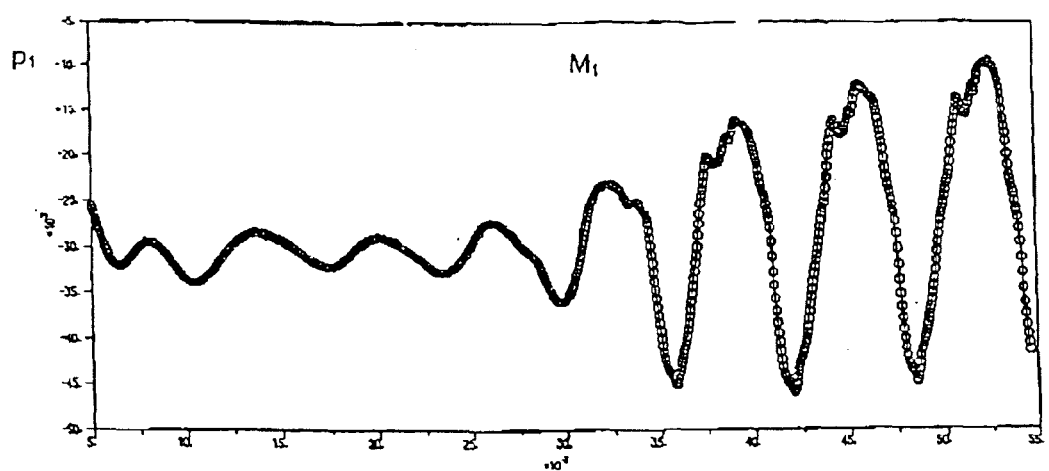
Figure 5C:
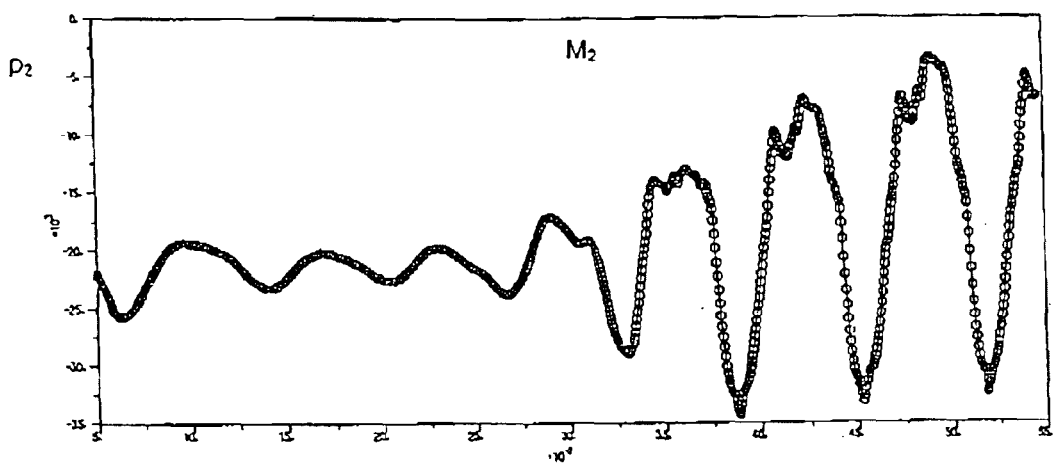

According to another, further development of the invention, the passageway 23 extends, as shown schematically in FIG. 5a, in such a way in the bluff body 20 that the measurement point $M_2$ defined with its lumen-side exit is likewise formed downstream from the separation edge 74 and, in fact, removed in the flow direction from the first measurement point.

It should also be mentioned that the passageways 22, 23 are preferably about at the same elevation, e.g. at the half-height level of the bluff body 20; if required, the at least two passageways 22, 23 can also be displaced relative to one another with respect to elevation, measured along the bluff body 20. Additionally, other passageways can be placed in the bluff body 20 besides the two passageways 22, 23, for instance at the upper end of the bluff body 20 right by the wall of the measurement tube 11 or at the lower end of the chamber 21.

In the embodiment shown in FIGS. 1 and 2, the sensor arrangement includes a pressure, or pressure fluctuation, sensitive sensor element 30, as the case may be, that protrudes through the bore 14 into the chamber 21, where it extends almost right up the dividing wall 29. The sensor element 30 is carried by a flange 31, which is secured on the flat area by means of screws 32.

Figure 3A:
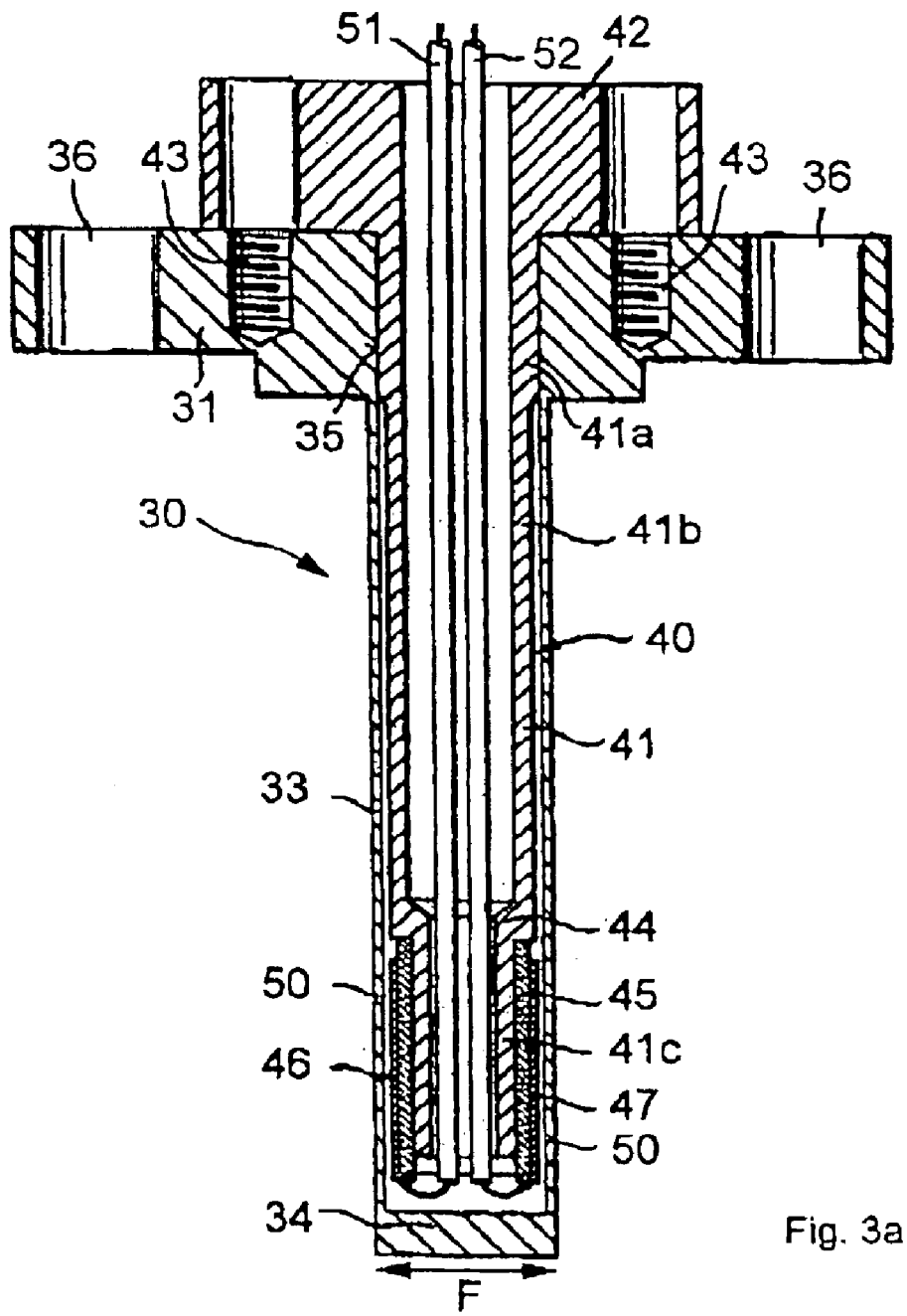
Figure 3B:
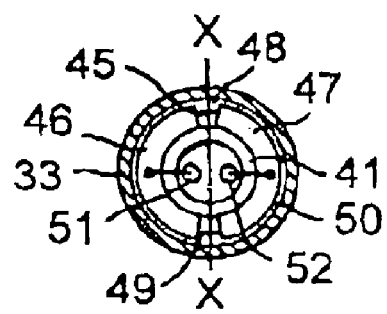

FIGS. 3a, 3b show details of the sensor element 30 in cross section. It is composed essentially of two components. The first component is a tube-shaped sensor shell 33, which is connected at one end with the flange 31 and sealed on the opposite end by an end wall 34. The flange 31 has a central opening 35, which is coaxial with the sensor shell 33 and whose diameter is equal to the inner diameter of the sensor shell 33. Furthermore, the flange 31 has a plurality of bores 36 distributed around its periphery to receive the screws 32, with which it is secured on the flat area 13 (FIG. 2). The sensor shell 33 can be formed together with the end wall 34 in one piece with the flange 31 out of the same material, for example steel.

The second component of the sensor element 30 is an electrode holder 40, which protrudes through the central opening of the flange 31 into the interior of the sensor shell 33. The electrode holder 40 is made from a tube 41, which is connected with a second flange 42 and is preferably manufactured as one piece with the flange 42, for example likewise of steel. Flange 42 is secured on the upper side of the flange 31 with screws 43, so that the electrode holder 34 protrudes through the central opening 35 into the interior of the sensor shell 33, where it extends to near the end wall 34.

The tube 41 of the electrode holder 40 has three sections of different diameter. A first section 41a, which sits in the central opening 35 of the flange 31, has an outer diameter, which is equal to the diameter of the central opening 35, whereby a solid seating and an exact positioning of the electrode holder is assured. The outer diameter of a second section 41b, which forms the largest part of the length of the electrode holder, is somewhat smaller than the inner diameter of the sensor shell 33, so that peripherally there exists a narrow, annular gap between the second 41b and the sensor shell 33. The terminal section 41c of the tube 41 joins with the middle section 41b at an inwardly jumping shoulder 44 and has a significantly smaller diameter. This terminal section 41c carries an insulating sleeve 45, whose outer diameter is somewhat smaller than the outer diameter of the middle section 41b. The insulating sleeve 45 can, for example, be of ceramic. On the insulating sleeve 45 are two capacitor electrodes 46 and 47, which cover the largest part of the peripheral surface and the lower end surface of the insulating sleeve 45, but remain separated from one another mechanically and electrically at two diametrically opposite locations by gaps 48, 49, as the lower, end view of FIG. 3b shows. The capacitor electrodes 46, 47 can be formed by a metallizing applied on the insulating sleeve or by metal foils adhesively bonded thereon. The thicknesses of the insulating sleeve 45 and the capacitor electrodes 46, 47 are so chosen that an annular gap 50 of small gap width exists around the periphery.

Each capacitor electrode 46, 47 forms with the oppositely situated section (acting as its counter electrode) of the sensor shell 33 a capacitor, whose dielectric is air. The capacitance of each of these capacitors is proportional to the surface area of the capacitor electrode and inversely proportional to the gap width between the capacitor electrode and the sensor shell.

Soldered at the sections of the capacitor electrodes 46 and 47 covering the lower end surface of the insulating sleeve 45 are the internal conductors of two shielded cables 51, 52, which are led through the hollow interior of the electrode holder 40 and through the tube-shaped housing nozzle 15 to connect the capacitor electrodes 46, 47 with the electronic evaluation circuit of the vortex flow meter situated in the circuit housing 16.

As shown in FIG. 2, the outer diameter of the sensor shell 33 of the sensor element 30 is somewhat smaller than the inner diameter of the chamber 21, so that the sensor shell 33 is spaced on all sides from the wall of the chamber 21. Thus, there is a free space in the chamber 21 around the sensor shell 33. This free space is filled through the passageways 22 and 27 with the flow medium, which flows through the flow channel 12 of the measurement tube 11. The sensor element 30 is installed in the bluff body 20 such that the capacitor electrodes 46, 47 lie symmetrically to the axial central plane that contains the axes of the measurement tube 11 and the bluff body 20 and is indicated in FIG. 3b by the line X—X.

The described structure of the vortex flow meter 10 functions as follows:

Each of the two components of the sensor element 30, namely the sensor shell 33 and the electrode holder 40, represents an elongated oscillating body, which is held at its one end and whose free end can be moved by the action of external forces out of the rest position shown in FIG. 2 or FIG. 3a transversely to its longitudinal direction.

When a flow medium flows through the measurement tube 11 and the two Karman vortex streets form at the bluff body, pressure fluctuations arise laterally to the bluff body. These periodic fluctuations, which are out of phase with one another, are transmitted through the passageways 22 and 23 into the chamber 21 and act on the sensor shell 33. Under the influence of the forces coming from these vortex pressure fluctuations, the sensor shell 33 is alternately deflected in opposite directions transversely to its longitudinal direction and transversely to the flow direction. Since the sensor shell 33 is securely clamped at the upper end, the deflection is in the form of a bending, so that the sensor shell executes bending oscillations under the action of the vortex pressure fluctuations. The frequency of these bending oscillations is equal to that of the pressure fluctuations. The bending oscillation characteristic resonance frequency of the sensor shell 33 is very much higher than the highest occurring frequency of the vortex pressure fluctuations, so that the bending oscillations of the sensor shell 33 are sub-critically excited and follow the vortex pressure fluctuations exactly in frequency and phase. The amplitudes of the bending oscillations are very small, and the components of the sensor element 30 are so formed and dimensioned, that the sensor shell 33 neither hits the wall of the chamber 21 nor the electrode holder 40 at the greatest occurring oscillation amplitudes.

The upper passageways 24, 25 and the lower passageways 26, 27 allow in the bluff body 20 a free circulation of the flow medium between the chamber 21 and the flow channel 12, so that the flow medium can freely follow the bending oscillations of the sensor shell 33 to and fro. The dividing wall 29 between the lower passageways 26 and 27 prevents a direct pressure equalization around the lower end of the sensor shell.

The electrode holder 40 arranged in the interior of the sealed sensor shell 33 is not in contact with the flow medium and is, therefore, completely de-coupled from its pressure fluctuations. The electrode holder 40 is, consequently, not caused to execute bending oscillations by the vortex pressure fluctuations, but, instead, remains at rest. Because of this situation, the free end of the sensor shell 33 moves under the influence of the vortex pressure fluctuations relative to the fixed free end of the electrode holder, as indicated in FIG. 3a by the double-arrow F. In the course of this relative movement, the width of the air gap 50 between the electrodes 46, 47 and the opposing wall of the sensor shell 33 varies in the opposite sense: When the separation between the sensor shell 33 and the electrode 46 decreases, simultaneously the separation between the sensor shell 33 and the electrode 47 gets bigger, and vice versa. As a consequence, the capacitance values of the capacitors formed by the two electrodes 46, 47 and the sensor shell 33 change oppositely with the frequency of the vortex pressure fluctuations.

It is to be noted here that the sensor arrangement can, instead of the sensor element 30 shown here, also include pressure measurement cells communicating with the two measurement points. Especially when using such pressure measurement cells, the measurement points can, however, be e.g. arranged at the tube wall, i.e. the pressure measurement cells can be attached externally on the measurement tube spaced from one another. Moreover, for determining at least one of the pressures and/or vortex frequency, also e.g. a paddle-shaped oscillation body can be used, which can be arranged in manner known to those skilled in the art within the vortex street, thus downstream from the bluff body 20.

Figure 7A:
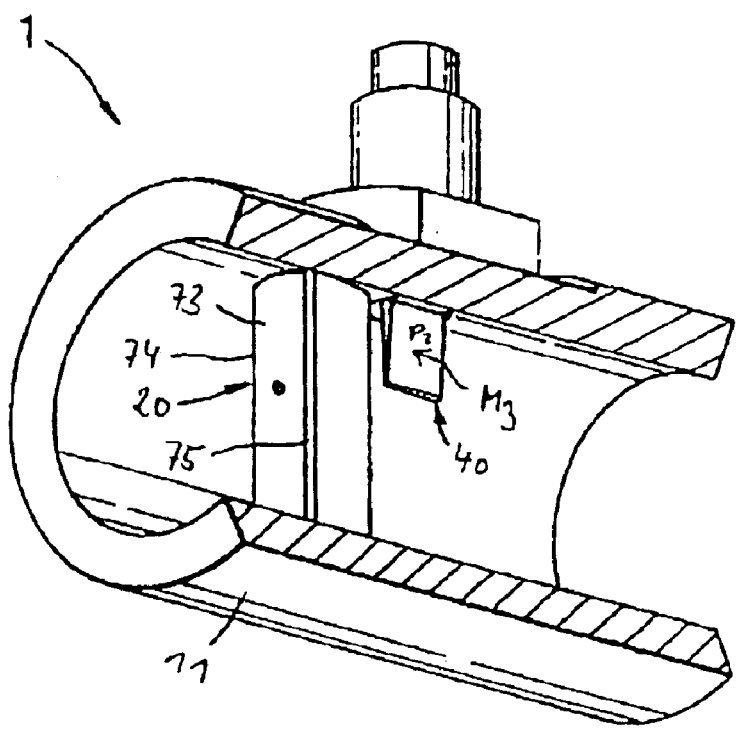
Figure 7B:
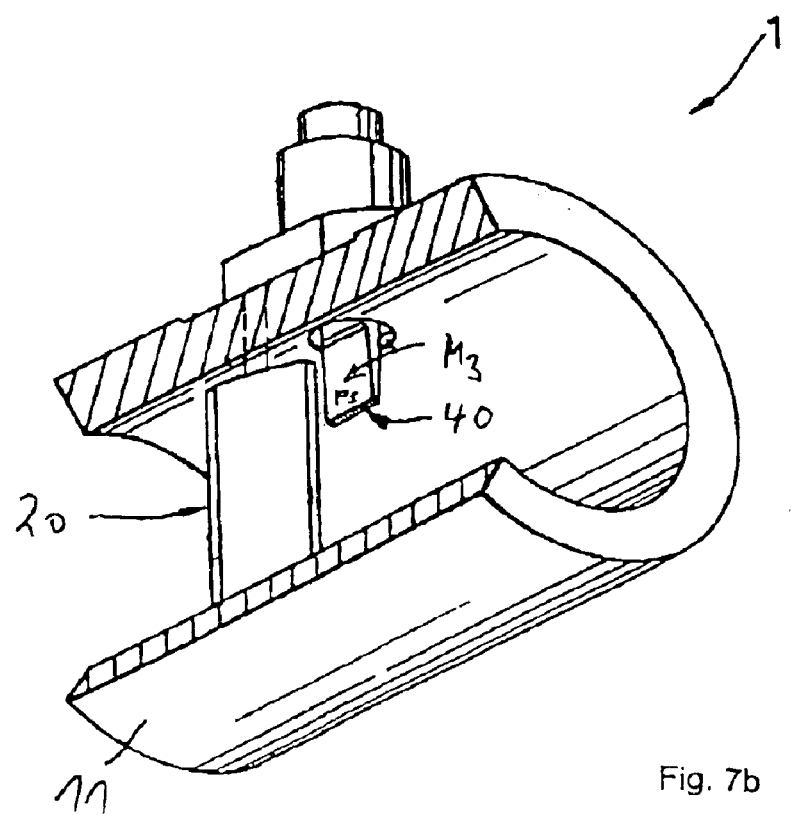

According to a further development of the invention as shown in FIGS. 7a, 7b, a second sensor element 40 immersed in the fluid downstream of the bluff body 20 is provided for registering the second pressure $p_2$ as well as a third pressure $p_2$. The sensor element 40 is, as quite usual for flow meters of this type, formed as a paddle-shaped oscillation body, which is excited into oscillation by the Karman vortices with the repetition frequency of the vortices.

In using a paddle-shaped oscillation body arranged downstream from the bluff body 20, wherein the second measurement point $M_2$ lies expediently on the one side of the oscillation body, a third measurement point is thus created in addition to the two measurement points $M_1$, $M_2$, where the third pressure $p_3$ can be registered, namely on the side of the oscillation body away from the measurement point $M_2$. At least with such a paddle-shaped oscillation body with fluid flowing on both sides a pressure difference between the two pressures $p_2$, $p_3$ can be directly registered. It is to be noted at this location that when using such an oscillation body with fluid flowing around it, the registered pressure $p_2$ or $p_3$, as the case may be, each is an average pressure $p_2$, $p_3$ averaged over the appropriate side of the oscillation body and, therefore, also the registered pressure difference is thus an average pressure difference.

Figure 8A:
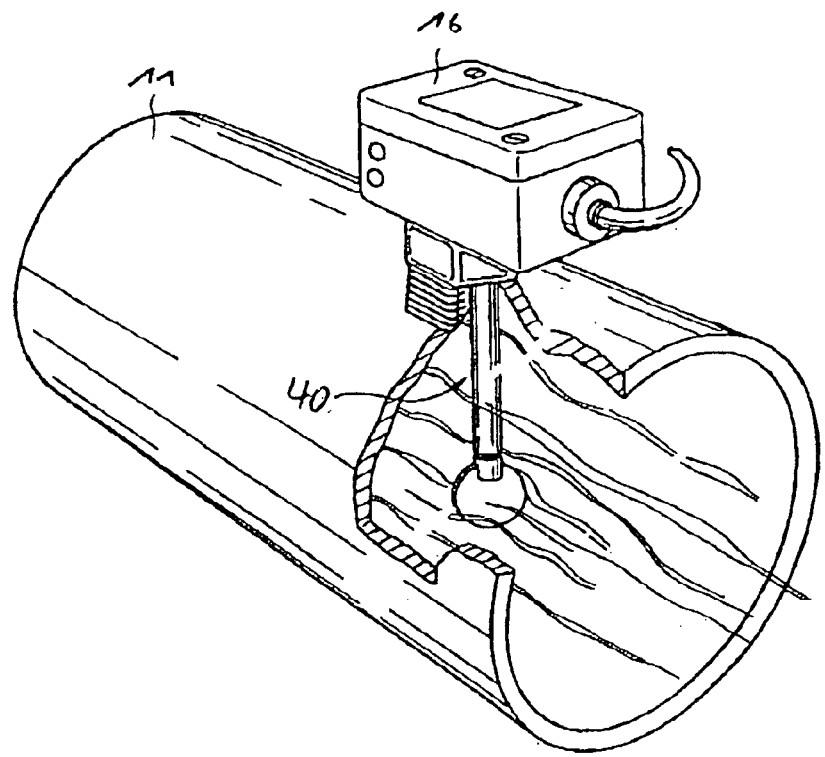
Figure 8B:
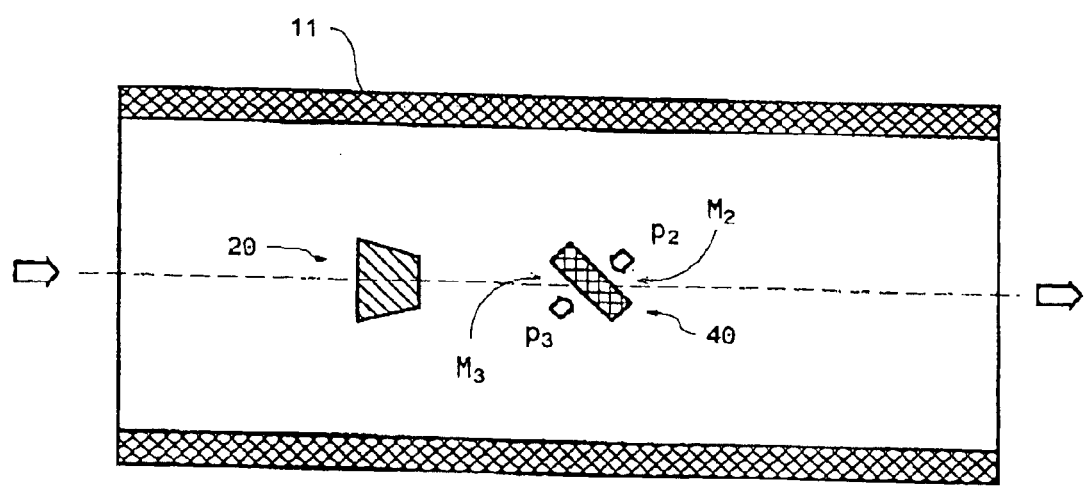

According to a further development of this extension of the invention, as shown schematically in FIGS. 8a, 8b, the sensor element 40 is so arranged in the measurement tube 11 that, as described, for example, also in the WO-A 95/16186, at least one lateral surface is oriented in such a way with respect to the longitudinal axis of the measurement tube 11 that a normal to this lateral surface forms with the longitudinal axis an angle larger than 0° and smaller than 90°, for example an angle between 20° and 60°. In the case of this further development of the invention, the two registered pressures $p_2$, $p_3$ thus concern pressures which exhibit both a dynamic pressure component and a static pressure component.

The vortex flow meter electronic measurement converter circuit housed in the electronics housing 16 can utilize the capacitance changes of the measurement capacitances $C_{M1}$, $C_{M2}$ to produce electrical, especially periodically changing, measurement signals, which characterize, on the one hand, the frequency of the vortex pressure fluctuations and, consequently, also the flow velocity in the measurement tube 11 and/or, on the other hand, the dynamic pressure or its change with time; see, in this connection, the FIG. 4b, 4c, 5b, 5c or 6b, 6c.

Figure 4D:
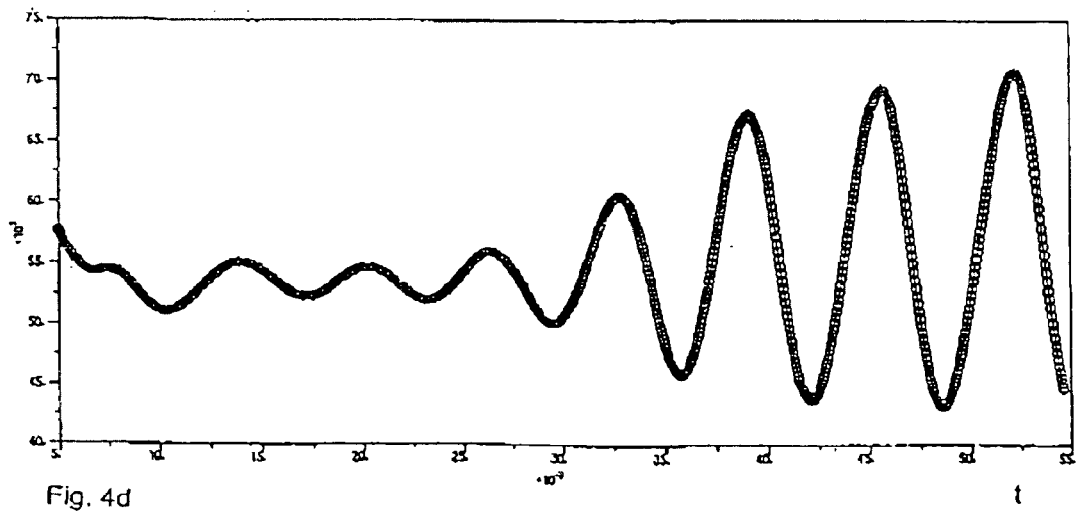
Figure 5D:
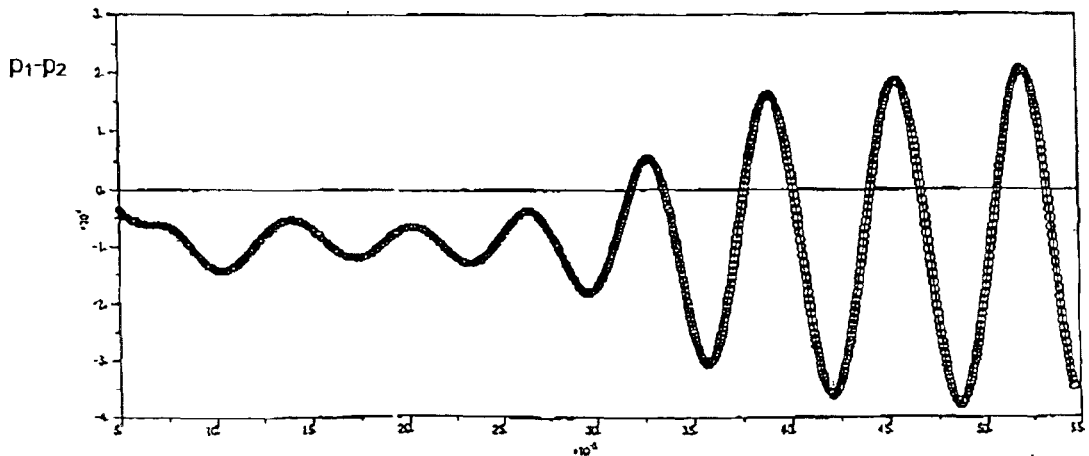
Figure 6D:
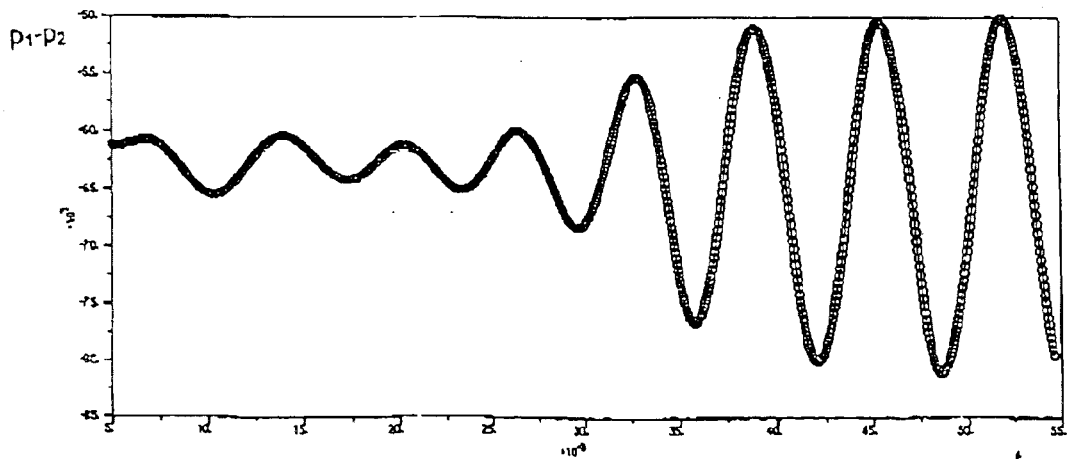
Figure 9:
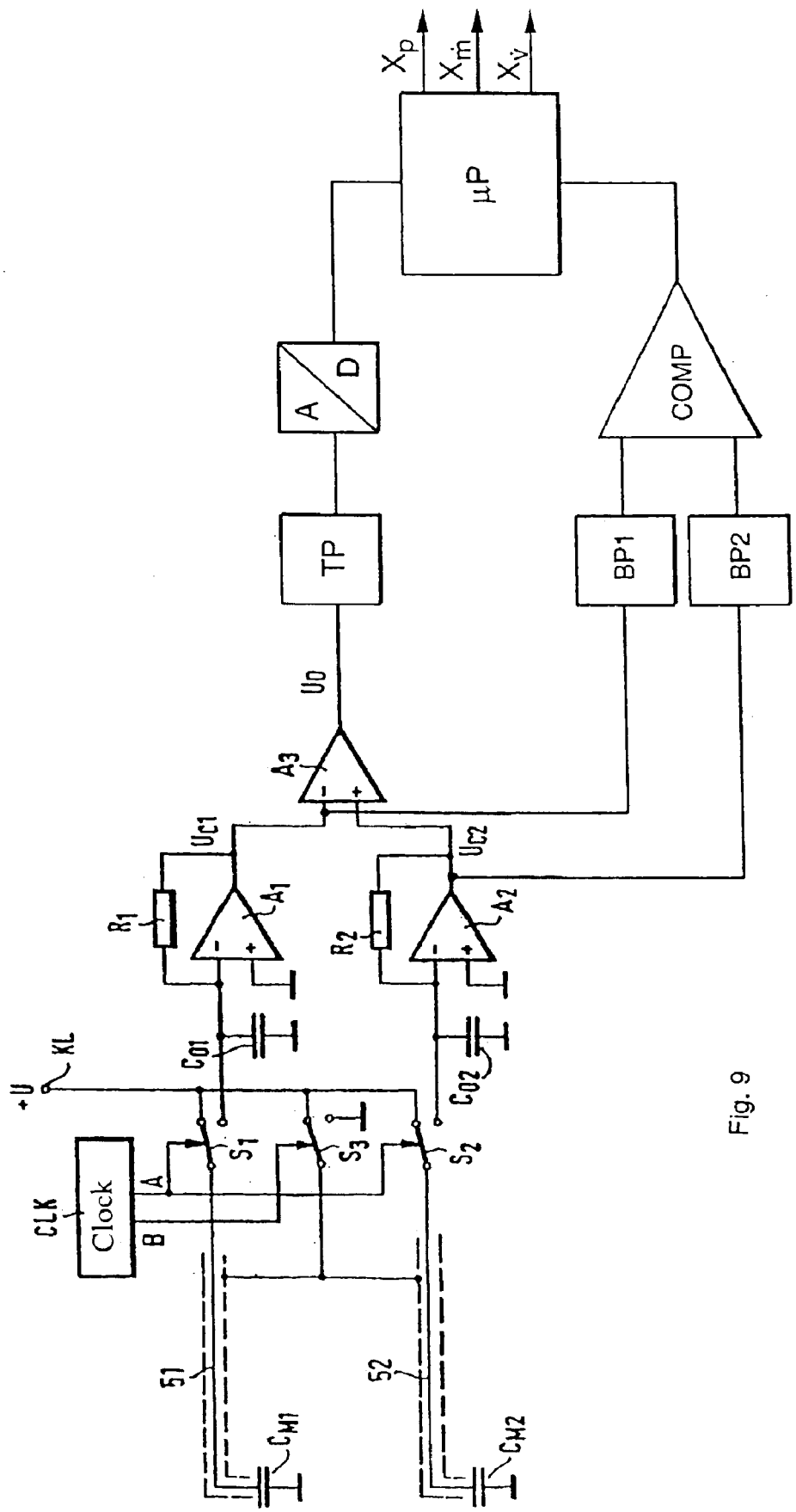
Figure 10:
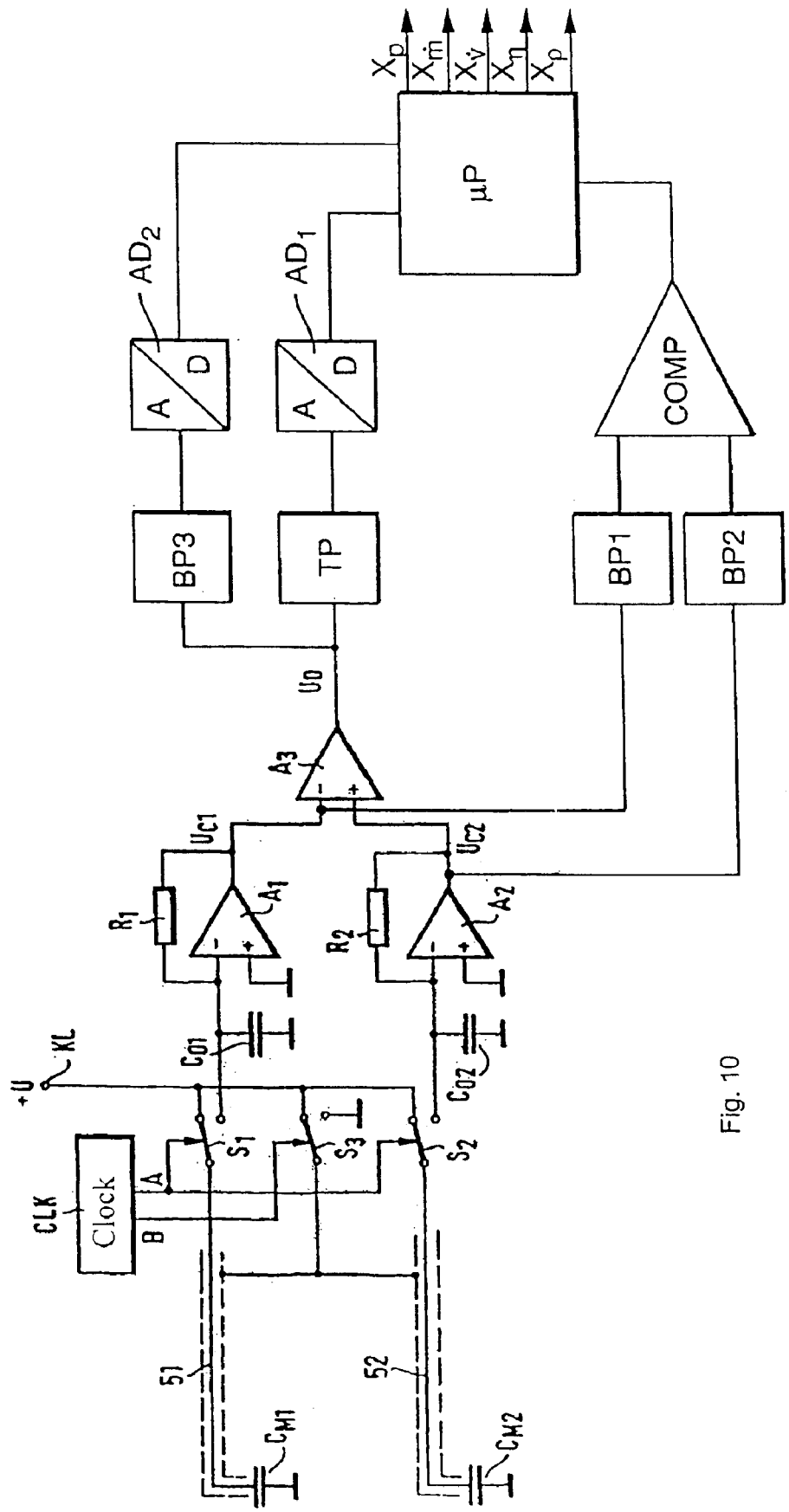

The electronic measurement converter circuit of the embodiments illustrated in FIG. 9 or 10 is each so structured that it produces a measurement signal $U_D$, which depends on the difference of the two measurement capacitances $C_{M1}$, $C_{M2}$ of the vortex sensor and consequently can serve as a pressure difference signal representing the difference $p_1-p_2$ between the pressures $p_1$, $p_2$ registered at the measurement points 22, 23; see, in this connection, the FIG. 4d, 5d or 6d. For the purpose of a further processing, the thus-produced measurement signal $U_D$, which is a function of the pressure difference $p_1-p_2$, is subsequently fed through a low-pass circuit TP.

Since the two capacitances change oppositely, the measurement signal corresponds to twice the value of the capacitance change, while the equally large base capacitances drop out of the measurement signal. This enables, on the one hand, a very accurate and sensitive detection of the capacitance changes and, on the other hand, the eliminating of the influence of other disturbances, which could affect the functioning of the vortex flow meter. This is true especially for the temperature of the fluid.

The vortex flow meter can be applied under very different temperature conditions, and also, within the same region of use, the temperature of the fluid can change within wide ranges. Temperature changes affect the dimensions of the components of the vortex sensor, due to the coefficients of thermal expansion of the materials used for the different components. When the components have equal coefficients of thermal expansion, their dimensions change in the same ratio, so that no changes show up in the two capacitances. In the case of components with different coefficients of thermal expansion, different length changes of the sensor shell of the electrode holder have no influence on the two capacitances. Different diameter changes of these parts can, it is true, lead to changes of the base capacitances, yet this is of no consequence for the signal evaluation, because the base capacitances drop out in the forming of the difference signal; the capacitance difference, which alone is registered, remains uninfluenced by temperature related changes.

In this connection it is also to be noted that the described embodiment of the vortex sensor exhibits an especially good compressive strength because of the cylindrical shape of the sensor shell and is, consequently, suited for applications where high operational pressures or large operating pressure fluctuations occur.

The FIGS. 9 and 10 each show a capacitance measurement circuit, which is especially well suited to be the input stage of the electronic evaluation circuit of the described vortex flow meter. This capacitance measurement circuit is constructed according to the known principle of switched capacitors and can be operated e.g. in the manner described in U.S. Pat. No. 4,716,770. It enables a very sensitive and exact measurement of capacitance changes, even when these are very small. Additionally, the capacitance measurement circuit of FIG. 9 or 10 is so constructed that it enables an active shielding in very simple manner.

As already mentioned, the electrical signals produced by the sensor arrangement 8 are processed by the evaluation electronics and displayed and/or transferred in usual manner. This can be done advantageously e.g. by digitizing the electric signals delivered from the measurement converter circuit and further processing by means of a microcomputer μP situated in the electronics housing 16. To this end, the low-pass filtered measurement signal $U_D$ is placed on the input of a first analog-to-digital converter $AD_1$; here the already mentioned low-pass circuit TP can serve also as an anti-aliasing filter.

The determination of the mass flow rate of the flowing fluid proceeds now with the determining of a dynamic pressure acting in the fluid and normalizing such on a volume flow rate or a flow velocity of the flowing fluid.

Figure 11A:
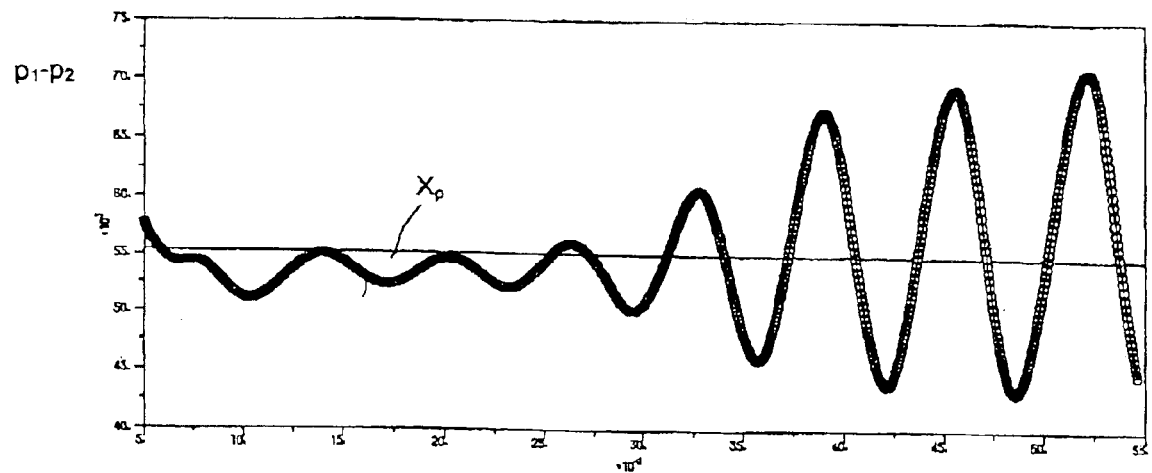

For determining the mass flow rate according to the invention, the measurement signal $U_D$ is used to form a pressure measurement value $X_p$, which represents an average dynamic pressure acting in the flow direction, averaged over time; see, in this connection, also FIG. 11a. Additionally, a flow rate measurement value $X_v$ is determined, in manner known to those skilled in the art, from the already mentioned Strouhal function, the measured repetition frequency and a corresponding calibration factor $K_v$. Advantageously, the repetition frequency can likewise be derived directly from the measurement signal $U_D$. The pressure measurement value $X_p$ actually determined on the basis of the registered first pressure $p_1$ and the registered second pressure $p_2$ is now normalized on the flow rate measurement value $X_v$, thus divided by this. Thus, the following applies:

$$X_m = K_m \cdot X_v / X_p \qquad (1),$$

wherein $K_m$ is a calibration factor for calculating the mass flow rate, to be determined by appropriate calibration measurements.

According to a preferred embodiment of the invention, a limit frequency of the low-pass circuit TP is so chosen for producing the pressure measurement value $X_p$ that the lowest expected vortex frequency and also potentially occurring disturbance signal frequencies can be filtered out of the supplied measurement signal, and, consequently, a pressure signal is available at the output of the low-pass circuit TP that essentially follows the curve of the time average of the measurement signal.

It is noted here that a measurement value, for example, derived from the digitized measurement signal, or even a signal amplitude, especially a sampled signal amplitude, of the analog pressure signal, can serve as the pressure measurement value $X_p$. In corresponding manner, the flow rate measurement value $X_v$ can, for example, also be a measurement value derived from a previously-formed frequency measurement signal changing with the repetition frequency.

For producing a corresponding frequency measurement signal, a preferred embodiment of the invention additionally provides that the measurement voltages $U_{C1}$, $U_{C2}$ representing the two measurement capacitances $C_{M1}$, $C_{M2}$ are produced and that these measurement voltages $U_{C1}$, $U_{C2}$, which are usually phase-shifted with respect to one another, are filtered by means of appropriate band pass filters BP1 and BP2, respectively, as shown also in FIG. 10. The band pass filters BP1, BP2 can, for example, be formed, in the same manner as the low-pass filter circuit, likewise according to the principle of switched capacitors.

The filtered measurement voltages are subsequently so placed on the input of a comparator COMP, that a binary, rectangular voltage is produced, with a signal frequency corresponding to the repetition frequency. The rectangular voltage is, in turn, fed to the microcomputer μP and can be processed further there for determining the repetition frequency.

Especially when using the above-mentioned microcomputer μP, the pressure measurement value or also the flow rate measurement value can be advantageously determined also on the basis of a spectral analysis of the pressure difference signal, e.g. on the basis of a discrete Fourier transformation, wherein, in the frequency spectrum, the pressure measurement value can then correspond to an amplitude at a frequency of null.

According to a further embodiment of the invention, the measurement signal $U_D$, especially the pressure measurement value $X_p$ derived from the measurement signal $U_D$, is used to produce a viscosity measurement value $X_n$ representing a viscosity of the fluid flowing in the measurement tube 11.

Figure 11B:
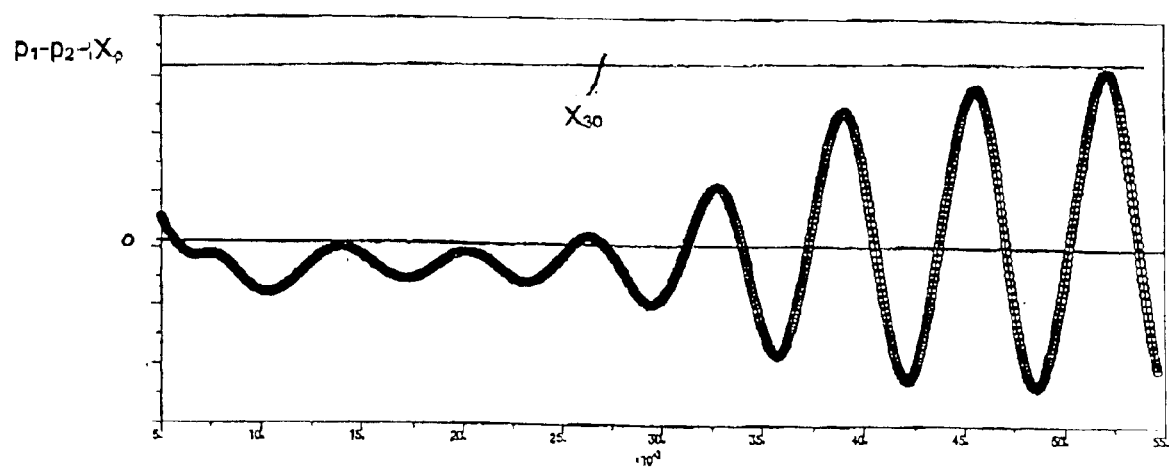

Moreover, the viscosity measurement value $X_n$ is determined on the basis of a deflection measurement value $X_{30}$, which represents an instantaneous or maximum deflection of an oscillatory motion of the sensor element 30 formed as an oscillation body. Advantageously, the oscillatory motion and, consequently, also the deflection measurement value $X_{30}$, can likewise be derived directly from the measurement signal $U_D$; see, in this connection, also the FIG. 11b. For producing the viscosity measurement value, the pressure measurement value $X_p$ in this embodiment of the invention is normalized on the deflection measurement value $X_{30}$, thus divided by this. The following holds:

$$X_n = K_n \cdot X_{30} / X_p \qquad (2),$$

wherein $K_n$ is calibration factor for calculating the viscosity, determined by corresponding calibration measurements.

According to one embodiment of the invention, the viscosity measurement value $X_n$ is produced by sending the measurement signal $U_D$ to a third low-pass circuit BP3, from which a middle frequency is so selected that, in operation, a signal portion with a signal frequency corresponding to the repetition frequency is allowed to pass. For the digital further-processing of the so-produced alternating signal, it is digitized by means of the second analog-to-digital converter $AD_2$ and subsequently, in turn, fed to the microcomputer μP.

What is claimed is:

1. A method for determining a mass flow rate of a fluid flowing in a pipe, comprising the steps of:

producing vortices, especially Karman vortices, in the flowing fluid by means of a bluff body around which the fluid flows, the bluff body having at least two separation edges, and determining a repetition frequency with which the vortices are produced;

producing, on the basis of the determined repetition frequency, a flow rate measurement value, which represents a volume flow rate or a flow velocity;

local registering of a first pressure, $p_1$, acting in the flowing fluid at a first measurement point, which is located, with reference to the flow direction, by the two separation edges of the bluff body or downstream from at least one of the separation edges;

local registering of a second pressure, $p_2$, acting in the flowing fluid at a second measurement point separated from the first measurement point in the flow direction: wherein, by the action of the generated vortices, at least one of the registered pressures, $p_1$, $p_2$, changes periodically at least with the repetition frequency; and producing, using the registered first pressure, $p_1$, and the registered second pressure, $p_2$, a pressure measurement value that represents an average dynamic pressure acting, averaged over time, at least partly in the flow direction, as well as producing, using the pressure measurement value and the flow rate measurement value, a mass flow rate measurement value a mass flow rate measurement value representing the mass flow.

2. The method as claimed in claim 1, wherein:

the repetition frequency, with which the vortices are produced, is determined on the basis of at least one of the registered pressures $p_1$, $p_2$.

3. The method as claimed in claim 1, wherein:

at least one of the measurement points is arranged at the bluff body or inside of the same.

4. The method as claimed in claim 1, wherein:

a pressure difference between the two locally registered pressures is determined for producing the pressure measurement value.

5. The method as claimed in claim 3, wherein:

a differential pressure sensor, especially one arranged within the bluff body, is exposed, especially simultaneously, to the first and second pressures, $p_1$, $p_2$, for registering the pressure difference.

6. The method as claimed in claim 4, wherein:

a pressure difference signal is derived from the locally registered pressures, $p_1$, $p_2$, to represent the pressure difference.

7. The method as claimed in claim 6, wherein:

the pressure difference signal is digitized for producing the pressure measurement value.

8. The method as claimed in claim 6, wherein:

the pressure measurement value and/or flow rate measurement value is/are determined on the basis of a spectral analysis, especially a digital spectral analysis, of the pressure difference signal.

9. The method as claimed in claim 1, wherein:

one of the locally registered pressures $p_1$, $p_2$ is a total pressure acting in the flow direction and/or a static pressure acting in the fluid.

10. The method as claimed in claim 1, wherein:

a sensor element in the form of an oscillating body arranged within, or downstream from, the bluff body is used for determining the pressure difference.

11. A method for determining a viscosity of a fluid flowing in a pipe, which method includes the steps of:

producing vortices, especially Karman vortices, in the flowing fluid by means of a bluff body around which the fluid flows, the bluff body having at least two separation edges;

local registering of a first pressure, $p_1$, acting in the flowing fluid at a first measurement point, which is located, with reference to the flow direction, by the two separation edges of the bluff body or downstream from at least one of the separation edges;

local registering of a second pressure, $p_2$, acting in the flowing fluid at a second measurement point separated from the first measurement point in the flow direction, wherein, by action of the generated vortices, at least one of the registered pressures $p_1$, $p_2$, changes periodically at least with a repetition frequency with which the vortices are produced; and producing, using the registered first pressure, $p_1$, and the registered second pressure, $p_2$, a pressure measurement value that represents an average dynamic pressure acting, averaged over time, at least partly in the flow direction, as well as producing, using the pressure measurement value, a viscosity measurement value representing the viscosity to be measured.

12. The method as claimed in claim 11, further comprising steps of: oscillating a sensor element, which is disposed in the pipe downstream from the separation edges, with said repetition frequency;

determining a deflection of said sensor element and producing a deflection measurement value, which represents a instantaneous deflection of said sensor element; and using said deflection measurement value to determine said viscosity measurement value.

13. The method as claimed in claim 12, further comprising a step of:

dividing said deflection measurement value by said pressure measurement value.

14. The method as claimed in claim 12, wherein:

the deflection measurement value represents a maximum deflection of said sensor element.

* * * * *